UNITED STATES PATENT OFFICE.

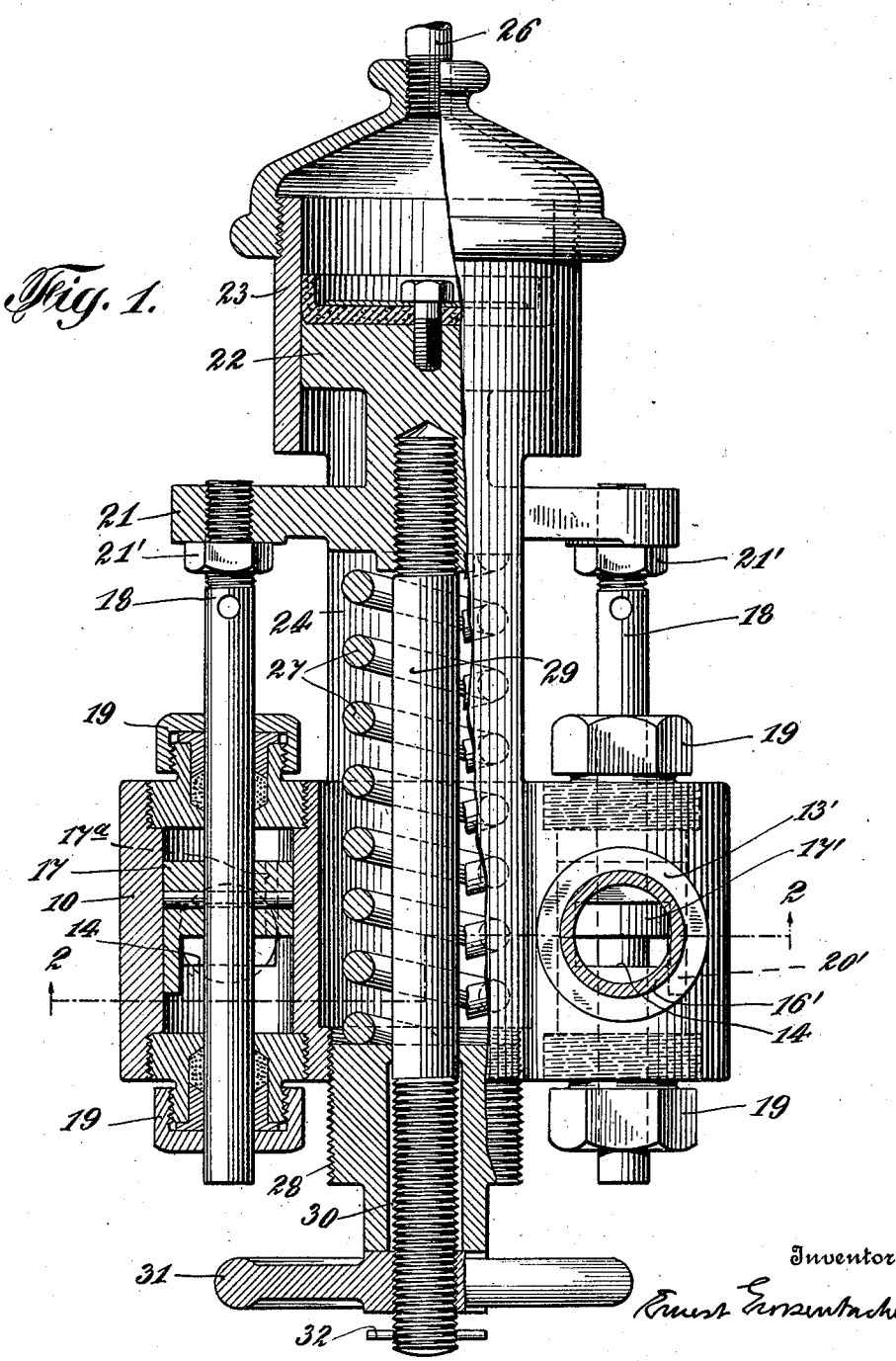

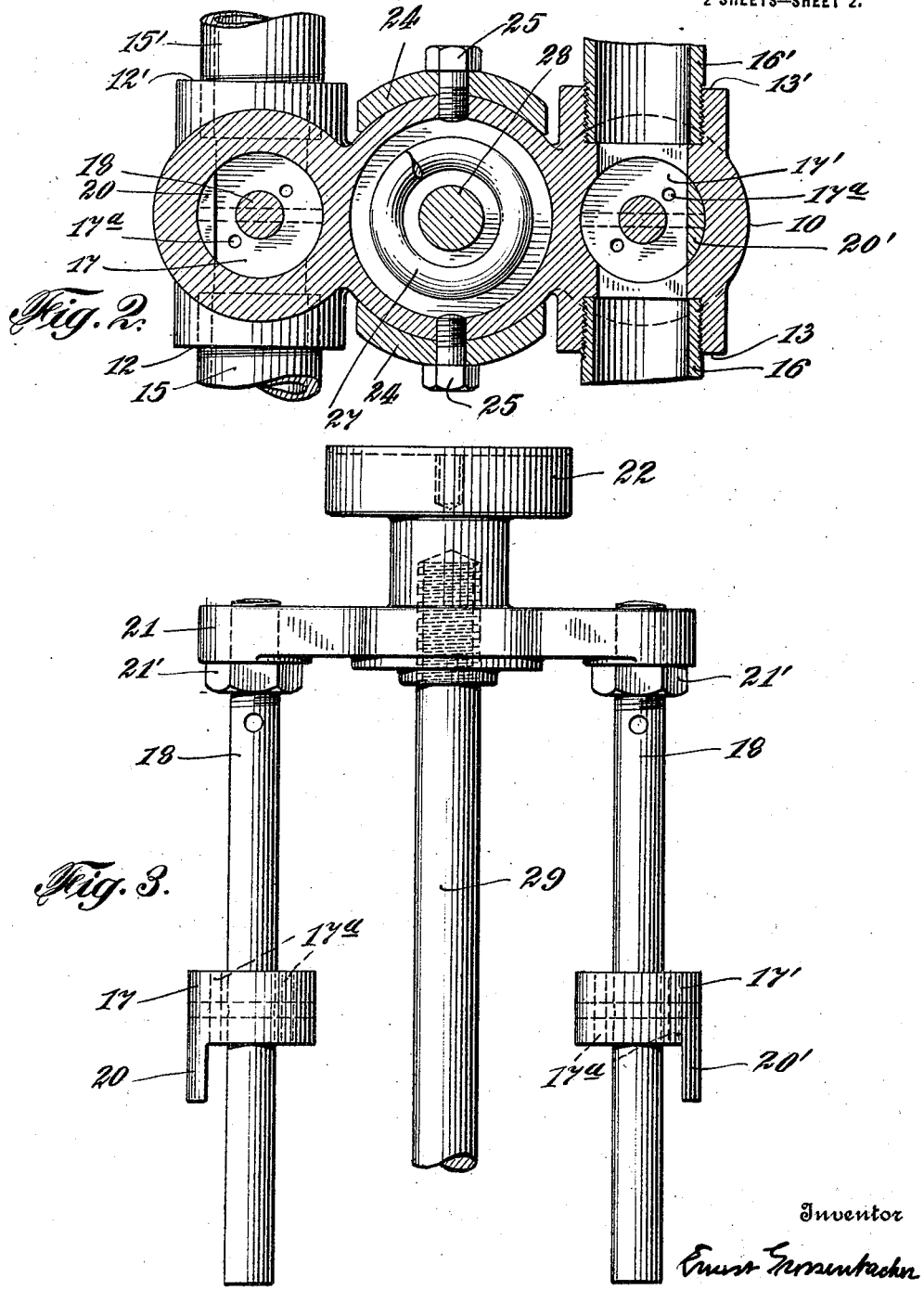

ERNEST GROSSENBACHER, OF FAJARDO, PORTO RICO.

AUTOMATIC REGULATOR FOR FUEL-OIL BURNERS.

1,401,599.	Specification of Letters Patent.	Patented Dec. 27, 1921.

Application filed June 22, 1921. Serial No. 479,458.

*To all whom it may concern:*

Be it known that I, ERNEST GROSSENBACHER, a citizen of the United States, and resident of Fajardo, Porto Rico, have invented certain new and useful Improvements in Automatic Regulators for Fuel-Oil Burners, of which the following is a specification.

My invention relates to regulators for fuel oil burners and has for its object to provide a simple and efficient apparatus of novel construction whereby the admixture of an atomizing agent such as steam, air or the like and the fuel oil may be automatically controlled and whereby the predetermined proportions of the steam or other agent and the oil may be automatically maintained at a substantially constant point. Other more specific objects of my invention will appear from the description hereinafter and the features of novelty will be pointed out in the appended claims.

In the accompanying drawings, which illustrate an example of my invention without defining its limits, Figure 1 is a sectional elevation of the regulator; Fig. 2 is a horizontal section on the line 2—2 of Fig. 1, and Fig. 3 is a detail view of the controlling valves and their actuating means.

As shown in the drawings, the regulator comprises a body 10 provided with a plurality of valve chambers 11 and with passages 12, 12' and 13, 13' which communicate with said chambers through openings 14, preferably of rectangular form, as illustrated in Fig. 1. The passages 12 and 13 constitute inlets, respectively, for the steam or other atomizing agent and the fuel oil respectively, and accordingly are arranged for connection with sources of such elements through the medium of pipes 15 and 16; the passages 12' and 13', on the other hand, comprise outlets and are arranged for connection, by means of pipes 15' and 16', with the burner, which may be of any well known and existing construction. Valves 17 and 17' are slidingly mounted in the chambers 11 so as to be movable transversely across the openings 14 and are carried by valve stems 18 which pass through and are slidable in suitable stuffing boxes 19 on the body 10; the valves 17 and 17' are provided with shields 20 and 20' which depend therefrom and comprise integral parts thereof, said shields, in the illustrated example, representing downwardly extending segments of said valves movable therewith in directions transverse to the openings 14. In order to permit ready operation thereof, said valves are further preferably provided with apertures 17$^a$ whereby a balance in opposite sides of said valves is maintained.

The valve stems 18 are mounted upon a yoke 21 so as to be independently adjustable relatively thereto in a lengthwise direction and also about their axes, suitable lock-nuts 21' being provided for fixing said stems and with them the valves 17 and 17' in their adjusted positions.

The means whereby the valves are automatically actuated consists of a piston 22 which comprises an integral part of the yoke 21 and is slidable in a cylinder 23 mounted upon the body 10 by means of members 24 fastened in place by means of bolts or the like 25. The cylinder 23 is connected through the medium of a pipe 26 with the boiler in which steam is being generated by the action of the burner with which the regulator is connected, the connection between said cylinder and the boiler being such that the piston 22 is subject to the influence of the steam pressure in said boiler. A spring 27 is located between the yoke 21 and a plug 28, which is screwed into the body 10 and serves to counteract or resist the action of the piston 22, the tension of said spring 27 being changed by adjusting the plug 28 in the body 10. In its illustrated form the regulator includes also a means whereby the movement of the valves 17 and 17' in the direction of opening is arrested or, in other words, whereby the fully open position of said valves is positively determined. As shown, this means which, in addition to its other functions, constitutes a means for manually actuating the valves, comprises a limit rod 29 which is attached to the yoke 21 and which extends through and beyond an axial opening 30 in the plug 28, it being understood that the dimensions of said opening 30 are such as to permit a sliding movement of the rod 29 relatively to said plug 28. The rod 29 is screw-threaded for the reception of a handwheel 31 and a limit nut 32, the former being arranged for contact with the plug 28 and the nut 32 being set to a predetermined position to prevent over-working of the apparatus; that is to say, to prevent more than a predetermined maximum of oil and steam from passing through the regulator for a boiler of given capacity.

When constructed in the form described the regulator is adjusted and operates as follows:

The connections between the body 10 and the fuel pipe 16 and steam pipe 15 and between the outlets 12' and 13' and the burner having been made, the cylinder 23 above the piston 22 is filled with water and connected by means of the pipe 26 with the boiler. Either at this stage or previously the valves 17 and 17' are adjusted relatively to each other in accordance with the mixture desired, it being understood that the adjustment may require a lengthwise movement of one or both valves or a rotative movement about their axes or both a lengthwise and rotative adjustment of one or both valves to secure the desired result.

The described adjustment of the valves 17 and 17' carries with it the shields 20, and if such adjustment, wholly or in part, comprises rotative movements about the axes of the stems 18, causes said shields 20 to cover up the openings 14 to a predetermined extent and thus cut down the open area thereof through which the particular element, steam or oil may pass. It is therefore possible to selectively control the effective area of said openings and consequently of the passages to which they lead in accordance with the predetermined proportions of admixture desired.

Steam is now opened up under full pressure and also opened up to the burner, the valves 17 and 17' at this stage, however, being in their closed position. When this has been done the spring plug 28 is slowly taken up or adjusted until steam is seen to escape from the burner, the adjustment of said plug serving to open up the valves 17 and 17'. The oil connection between the regulator and the burner which, up to this point, has remained closed, is now opened and the burner is ignited in the customary manner. As soon as the boiler pressure appears to drop, the spring plug 28 is adjusted inwardly still farther to open up the valves 17 and 17' to a greater extent, which adjustment is continued until the boiler pressure remains constant. When this condition has been reached the hand-wheel 31 is adjusted on the limit rod 29 until there is a clearance of about one-sixteenth of an inch between it and the plug 28, after which the limit nut 32 is loosely set against said hand-wheel. The regulator is now properly adjusted and the valves 17 and 17' will be automatically actuated in one direction by the steam pressure upon the piston 22, whereby said valves are closed more or less to cut down the fuel supply to the burner and to coincidentally regulate the steam in accordance to provide the proper mixture and to reduce the flame. When the steam pressure upon the piston 22 falls, the valves 17 and 17' are opened up by the action of the spring 27 to increase the supply of fuel to the burner and to concurrently regulate the steam accordingly to provide the proper mixture for an increased flame. Thus, whatever adjustment of the valves 17 and 17' may follow from an actuation of the piston 22 or because of the action of the spring 27, the correct proportions of oil and steam required in each instance to secure maximum efficiency are automatically maintained while at the same time the boiler pressure is maintained at a substantially constant point without the services of an attendant.

When it is desired to shut down the boiler, the hand-wheel 31 is screwed up on the limit rod 29, and by bearing against the plug 28, closes the valves 17 and 17' and thus extinguishes the burner; when starting up, the hand-wheel 31 is operated in the reverse direction after the main steam and oil valves have been opened up respectively. The hand-wheel 31, in coöperation with the plug 28, also serves to limit the extent of opening of the valves 17 and 17' under the action of the spring 27 when pressure on the piston 22 is reduced; by adjusting the position of said hand-wheel on the limit rod 29 the extent of opening of said valves 17 and 17' may be varied.

By rotating said valves 17 and 17' about their axes, for instance through the medium of a suitable tool applied to the stems 18, and setting them by means of the lock-nut 21', the supply of atomizing agent and fuel oil passing beyond said valves may be regulated so as to provide any desired relative proportions in the mixture, and the proper mixture, once obtained, will be maintained regardless of the positions which said valves may assume. In the case of oil burners this means that perfect combustion is obtained and no surplus steam, air, oil or gas will be blown into the furnace.

The apparatus, in its illustrated form, is simple in construction and efficient in operation and is particularly adapted for use in connection with large size boilers. The form of valves and their shields provide a controlling means of maximum efficiency for selectively controlling and adjusting the proportions of steam or other atomizing agent and oil in accordance with conditions whereby the most economical and effective operation of the burner is secured.

Various changes in the specific form shown and described may be made within the scope of the claims without departing from the spirit of my invention.

I claim:

1. An automatic regulator for fuel oil burners comprising a body having a plurality of passages therein for the passage of fuel oil and an atomizing agent, valves movable transversely across said passages for controlling the same, said valves being adjustable independently of each other, means carried by said valves and movable across said passages whereby the effective areas thereof are selectively varied through the adjustment of said valves and means for operating said valves without disturbing said adjustment.

2. An automatic regulator for fuel oil burners comprising a body having a plurality of passages therein for the passage of fuel oil and an atomizing agent, valves movable transversely across said passages for controlling the same, said valves being adjustable independently of each other, shields carried by said valves and adjustable with the latter across said passages to selectively cut off parts thereof whereby the effective areas of said passages are varied and means for concurrently actuating said valves without disturbing said adjustment.

3. An automatic regulator for fuel oil burners comprising a body having a plurality of valve chambers therein and provided with a plurality of passages communicating with said chambers through openings of rectangular form, valves slidable in said chambers and movable transversely across said openings, said valves being independently adjustable about their axes, shields carried by said valves and adjustable therewith across said openings to selectively cut off portions thereof whereby the effective areas of said openings are varied and means for coincidentally actuating said valves without disturbing the adjustment of said shields.

4. An automatic regulator for fuel oil burners comprising a body having a plurality of valve chambers therein and provided with a plurality of passages communicating with said chambers through openings of rectangular form, a yoke, valves slidable in said chambers and connected with said yoke and movable transversely across said openings, shields depending from said valves and movable therewith across said openings, said valves being independently rotatable relatively to said yoke to selectively adjust said shields across said openings whereby predetermined portions of the latter are covered to vary the effective areas of said openings, a cylinder and a piston movable therein and comprising an integral part of said yoke whereby the valves are actuated.

In testimony whereof I have hereunto set my hand.

ERNEST GROSSENBACHER.